(12) United States Patent
Kumar

(10) Patent No.: US 8,755,815 B2
(45) Date of Patent: Jun. 17, 2014

(54) USE OF WIRELESS ACCESS POINT ID FOR POSITION DETERMINATION

(75) Inventor: Nitin Kumar, San Ramon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 313 days.

(21) Appl. No.: 12/872,703

(22) Filed: Aug. 31, 2010

(65) Prior Publication Data

US 2012/0052874 A1 Mar. 1, 2012

(51) Int. Cl.
*H04W 64/00* (2009.01)

(52) U.S. Cl.
USPC .................................... 455/456.1; 455/456.3

(58) Field of Classification Search
USPC ............. 455/456.1, 403, 404.1, 404.2, 412.1, 455/412.2, 3.02, 456.3
See application file for complete search history.

(56) References Cited

U.S. PATENT DOCUMENTS

| | | | |
|---|---|---|---|
| 4,907,290 A | 3/1990 | Crompton | |
| 5,010,547 A | 4/1991 | Johnson et al. | |
| 5,012,219 A | 4/1991 | Henry | |
| 5,075,684 A | 12/1991 | DeLuca | |
| 5,359,317 A | 10/1994 | Gomez et al. | |
| 5,375,226 A | 12/1994 | Sano et al. | |
| 5,394,140 A | 2/1995 | Wong et al. | |
| 5,430,436 A | 7/1995 | Fennell | |
| 5,455,466 A | 10/1995 | Parks et al. | |
| 5,508,736 A | 4/1996 | Cooper | |
| 5,594,796 A | 1/1997 | Grube et al. | |
| 5,596,567 A | 1/1997 | de Muro et al. | |
| 5,600,225 A | 2/1997 | Goto | |
| 5,612,682 A | 3/1997 | DeLuca et al. | |
| 5,650,776 A | 7/1997 | Mitchell et al. | |
| 5,666,530 A | 9/1997 | Clark et al. | |
| 5,699,244 A | 12/1997 | Clark, Jr. et al. | |
| 5,705,995 A | 1/1998 | Laflin et al. | |
| 5,727,202 A | 3/1998 | Kucala | |
| 5,729,735 A | 3/1998 | Meyering | |
| 5,733,313 A | 3/1998 | Barreras et al. | |
| 5,742,521 A | 4/1998 | Ellenby et al. | |
| 5,758,150 A | 5/1998 | Bell et al. | |
| 5,760,580 A | 6/1998 | Tyren | |
| 5,787,233 A | 7/1998 | Akimoto | |
| 5,815,411 A | 9/1998 | Ellenby et al. | |
| 5,831,348 A | 11/1998 | Nishizawa | |

(Continued)

FOREIGN PATENT DOCUMENTS

| | | |
|---|---|---|
| CN | 1592197 A | 3/2005 |
| CN | 1846330 A | 10/2006 |

(Continued)

OTHER PUBLICATIONS

U.S. Appl. No. 11/430,786, filed May 8, 2006, Baraban, et al.

(Continued)

*Primary Examiner* — Cong Tran
(74) *Attorney, Agent, or Firm* — Mahamedi Paradice Kreisman LLP

(57) ABSTRACT

A mobile computing device comprises a wireless transceiver and a processing circuit. The processing circuit is configured to identify a location, to identify a wireless access point within a predetermined distance of the location, to detect a wireless access point identifier using the wireless transceiver, to compare the detected wireless access point identifier to the identified wireless access point, and to initiate location determination based on the comparison.

17 Claims, 4 Drawing Sheets

(56) References Cited

U.S. PATENT DOCUMENTS

| | | |
|---|---|---|
| 5,838,262 A | 11/1998 | Kershner et al. |
| 5,850,187 A | 12/1998 | Carrender et al. |
| 5,852,187 A | 12/1998 | Thorner et al. |
| 5,870,765 A | 2/1999 | Bauer et al. |
| 5,875,434 A | 2/1999 | Matsuoka et al. |
| 5,884,168 A | 3/1999 | Kolev et al. |
| 5,901,358 A | 5/1999 | Petty et al. |
| 5,903,852 A | 5/1999 | Schaupp, Jr. et al. |
| 5,929,848 A | 7/1999 | Albukerk et al. |
| 5,938,721 A | 8/1999 | Dussell et al. |
| 5,958,006 A | 9/1999 | Eggleston et al. |
| 5,958,051 A | 9/1999 | Renaud et al. |
| 5,974,238 A | 10/1999 | Chase, Jr. |
| 5,974,330 A | 10/1999 | Negishi |
| 6,006,274 A | 12/1999 | Hawkins et al. |
| 6,016,476 A | 1/2000 | Maes et al. |
| 6,037,936 A | 3/2000 | Ellenby et al. |
| 6,047,579 A | 4/2000 | Schmitz |
| 6,061,561 A | 5/2000 | Alanara et al. |
| 6,104,291 A | 8/2000 | Beauvillier et al. |
| 6,111,538 A | 8/2000 | Schuchman et al. |
| 6,138,245 A | 10/2000 | Son et al. |
| 6,141,014 A | 10/2000 | Endo et al. |
| 6,148,294 A | 11/2000 | Beyda et al. |
| 6,157,630 A | 12/2000 | Adler et al. |
| 6,177,905 B1 | 1/2001 | Welch |
| 6,182,010 B1 | 1/2001 | Berstis |
| 6,182,221 B1 | 1/2001 | Hsu et al. |
| 6,184,651 B1 | 2/2001 | Fernandez et al. |
| 6,212,529 B1 | 4/2001 | Boothby et al. |
| 6,222,583 B1 | 4/2001 | Matsumura et al. |
| 6,243,689 B1 | 6/2001 | Norton |
| 6,246,376 B1 | 6/2001 | Bork et al. |
| 6,259,405 B1 | 7/2001 | Stewart et al. |
| 6,266,539 B1 | 7/2001 | Pardo |
| 6,297,737 B1 | 10/2001 | Irvin |
| 6,307,556 B1 | 10/2001 | Ellenby et al. |
| 6,307,919 B1 | 10/2001 | Yoked |
| 6,313,745 B1 | 11/2001 | Suzuki |
| 6,330,436 B1 | 12/2001 | Zidel |
| 6,346,881 B1 | 2/2002 | Davidson |
| 6,360,101 B1 | 3/2002 | Irvin |
| 6,389,290 B1 | 5/2002 | Kikinis et al. |
| 6,389,423 B1 | 5/2002 | Sakakura |
| 6,400,274 B1 | 6/2002 | Duan et al. |
| 6,401,104 B1 | 6/2002 | LaRue et al. |
| 6,401,118 B1 | 6/2002 | Thomas |
| 6,404,761 B1 | 6/2002 | Snelling et al. |
| 6,405,049 B2 | 6/2002 | Herrod et al. |
| 6,414,696 B1 | 7/2002 | Ellenby et al. |
| 6,424,845 B1 | 7/2002 | Emmoft et al. |
| 6,436,299 B1 | 8/2002 | Baarman et al. |
| 6,445,936 B1 | 9/2002 | Cannon et al. |
| 6,446,076 B1 | 9/2002 | Burkey et al. |
| 6,456,234 B1 | 9/2002 | Johnson |
| 6,487,180 B1 | 11/2002 | Borgstahl et al. |
| 6,490,521 B2 | 12/2002 | Wiener |
| 6,501,364 B1 | 12/2002 | Hui et al. |
| 6,510,424 B1 | 1/2003 | Ford et al. |
| 6,532,152 B1 | 3/2003 | White et al. |
| 6,532,480 B1 | 3/2003 | Boothby et al. |
| 6,542,750 B2 | 4/2003 | Hendrey et al. |
| 6,559,794 B1 | 5/2003 | Nakajima et al. |
| 6,577,249 B1 | 6/2003 | Akatsuka et al. |
| 6,601,093 B1 | 7/2003 | Peters |
| 6,671,700 B1 | 12/2003 | Creemer et al. |
| 6,673,250 B2 | 1/2004 | Kuennen et al. |
| 6,681,108 B1 | 1/2004 | Terry et al. |
| 6,687,608 B2 | 2/2004 | Sugimoto et al. |
| 6,731,071 B2 | 5/2004 | Baarman |
| 6,731,613 B1 | 5/2004 | Provance |
| 6,757,718 B1 | 6/2004 | Halverson et al. |
| 6,772,331 B1 | 8/2004 | Hind et al. |
| 6,795,110 B1 | 9/2004 | Kossin |
| 6,799,190 B1 | 9/2004 | Boothby |
| 6,803,744 B1 | 10/2004 | Sabo |
| 6,806,649 B2 | 10/2004 | Mollema et al. |
| 6,810,405 B1 | 10/2004 | LaRue et al. |
| 6,812,645 B2 | 11/2004 | Baarman |
| 6,825,620 B2 | 11/2004 | Kuennen et al. |
| 6,831,417 B2 | 12/2004 | Baarman |
| 6,831,563 B1 | 12/2004 | Contractor |
| 6,832,178 B1 | 12/2004 | Fernandez et al. |
| 6,847,823 B2 | 1/2005 | Lehikoinen et al. |
| 6,850,986 B1 | 2/2005 | Peacock |
| 6,885,362 B2 | 4/2005 | Suomela |
| 6,888,438 B2 | 5/2005 | Hui et al. |
| 6,907,134 B1 | 6/2005 | Yamada et al. |
| 6,917,163 B2 | 7/2005 | Baarman |
| 6,920,328 B2 | 7/2005 | Wollrab |
| 6,928,452 B2 | 8/2005 | De La Huerga |
| 6,934,664 B1 | 8/2005 | Webb et al. |
| 6,941,270 B1 | 9/2005 | Hannula |
| 6,963,800 B1 | 11/2005 | Milbert |
| 6,975,198 B2 | 12/2005 | Baarman et al. |
| 6,982,962 B1 | 1/2006 | Lunsford et al. |
| 6,986,051 B2 | 1/2006 | Le Pennec et al. |
| 7,006,817 B2 | 2/2006 | Awada et al. |
| 7,027,823 B2 | 4/2006 | Mikuni |
| 7,065,658 B1 | 6/2006 | Baraban et al. |
| 7,084,758 B1 | 8/2006 | Cole |
| 7,088,389 B2 | 8/2006 | Shibasaki et al. |
| 7,103,370 B1 | 9/2006 | Creemer |
| 7,116,200 B2 | 10/2006 | Baraban et al. |
| 7,118,240 B2 | 10/2006 | Baraban et al. |
| 7,119,716 B2 | 10/2006 | Horstemeyer |
| 7,126,450 B2 | 10/2006 | Baraban et al. |
| 7,132,918 B2 | 11/2006 | Baraban et al. |
| 7,136,093 B1 | 11/2006 | Itoh et al. |
| 7,149,473 B1 | 12/2006 | Lindlar et al. |
| 7,164,255 B2 | 1/2007 | Hui |
| 7,164,885 B2 | 1/2007 | Jonsson et al. |
| 7,212,827 B1 | 5/2007 | Veschl |
| 7,248,017 B2 | 7/2007 | Cheng et al. |
| 7,256,731 B2 | 8/2007 | Siegel et al. |
| 7,260,399 B1 * | 8/2007 | Oh et al. .................. 455/436 |
| 7,262,700 B2 | 8/2007 | Hsu |
| 7,266,379 B2 | 9/2007 | Blight et al. |
| 7,271,569 B2 | 9/2007 | Oglesbee |
| 7,274,299 B2 | 9/2007 | Osman |
| 7,286,880 B2 | 10/2007 | Olson et al. |
| 7,323,964 B1 | 1/2008 | Shyu et al. |
| 7,331,793 B2 | 2/2008 | Hernandez et al. |
| 7,336,964 B2 | 2/2008 | Casey |
| 7,360,248 B1 | 4/2008 | Kanevsky et al. |
| 7,375,492 B2 | 5/2008 | Calhoon et al. |
| 7,382,636 B2 | 6/2008 | Baarman et al. |
| 7,385,357 B2 | 6/2008 | Kuennen et al. |
| 7,385,643 B2 | 6/2008 | Muramatsu |
| 7,392,059 B2 | 6/2008 | White et al. |
| 7,414,380 B2 | 8/2008 | Tang et al. |
| 7,424,447 B2 | 9/2008 | Fuzell-Casey et al. |
| 7,446,672 B2 | 11/2008 | Johnson et al. |
| 7,453,491 B2 | 11/2008 | Kinjo |
| 7,454,170 B2 | 11/2008 | Goossens et al. |
| 7,460,064 B1 | 12/2008 | Tester et al. |
| 7,460,953 B2 | 12/2008 | Herbst et al. |
| 7,462,951 B1 | 12/2008 | Baarman |
| 7,471,986 B2 | 12/2008 | Hatlestad |
| 7,490,294 B2 | 2/2009 | Okada |
| 7,495,414 B2 | 2/2009 | Hui |
| 7,509,432 B1 | 3/2009 | Peacock |
| 7,521,890 B2 | 4/2009 | Lee et al. |
| 7,545,415 B2 | 6/2009 | Azuma et al. |
| 7,576,514 B2 | 8/2009 | Hui |
| 7,583,972 B2 | 9/2009 | Clipsham |
| 7,593,925 B2 | 9/2009 | Cadiz et al. |
| 7,613,427 B2 | 11/2009 | Blight et al. |
| 7,613,428 B2 | 11/2009 | Blight et al. |
| 7,720,436 B2 | 5/2010 | Hamynen et al. |
| 7,743,151 B2 | 6/2010 | Vallapureddy et al. |
| 7,805,719 B2 | 9/2010 | O'Neill |
| D640,976 S | 7/2011 | Matsuoka |
| 8,228,234 B2 * | 7/2012 | Paulson et al. .................. 342/451 |

(56) References Cited

U.S. PATENT DOCUMENTS

| | | |
|---|---|---|
| 8,395,547 B2 | 3/2013 | Dhanani et al. |
| 2001/0015759 A1 | 8/2001 | Squibbs |
| 2001/0040629 A1 | 11/2001 | Miyagi et al. |
| 2001/0055373 A1 | 12/2001 | Yamashita |
| 2002/0001032 A1 | 1/2002 | Ohki |
| 2002/0010617 A1 | 1/2002 | Hamaguchi et al. |
| 2002/0011951 A1 | 1/2002 | Pepin et al. |
| 2002/0019584 A1 | 2/2002 | Schulze et al. |
| 2002/0036991 A1 | 3/2002 | Inoue |
| 2002/0061031 A1 | 5/2002 | Sugar et al. |
| 2002/0075323 A1 | 6/2002 | O'Dell |
| 2002/0078075 A1 | 6/2002 | Colson et al. |
| 2002/0084698 A1 | 7/2002 | Kelly et al. |
| 2002/0086680 A1 | 7/2002 | Hunzinger |
| 2002/0091793 A1 | 7/2002 | Sagie |
| 2002/0103008 A1 | 8/2002 | Rahn et al. |
| 2002/0136184 A1 | 9/2002 | Liang et al. |
| 2002/0147717 A1 | 10/2002 | Barros et al. |
| 2002/0151334 A1 | 10/2002 | Sharma |
| 2002/0154178 A1 | 10/2002 | Barnett et al. |
| 2002/0184331 A1 | 12/2002 | Blight et al. |
| 2002/0184418 A1 | 12/2002 | Blight |
| 2002/0191862 A1 | 12/2002 | Neumann et al. |
| 2002/0194498 A1 | 12/2002 | Blight et al. |
| 2003/0022682 A1 | 1/2003 | Weston et al. |
| 2003/0027553 A1 | 2/2003 | Davidson et al. |
| 2003/0052907 A1 | 3/2003 | Rekimoto |
| 2003/0054846 A1 | 3/2003 | Parry |
| 2003/0065742 A1 | 4/2003 | Culp et al. |
| 2003/0087602 A1 | 5/2003 | Kammer |
| 2003/0115224 A1 | 6/2003 | Obara et al. |
| 2003/0126180 A1 | 7/2003 | Bogart et al. |
| 2003/0164822 A1 | 9/2003 | Okada |
| 2003/0214255 A1 | 11/2003 | Baarman et al. |
| 2003/0233455 A1 | 12/2003 | Leber et al. |
| 2004/0024795 A1 | 2/2004 | Hind et al. |
| 2004/0049728 A1 | 3/2004 | Langford |
| 2004/0082341 A1 | 4/2004 | Stanforth |
| 2004/0088012 A1 | 5/2004 | Kroll et al. |
| 2004/0130915 A1 | 7/2004 | Baarman |
| 2004/0130916 A1 | 7/2004 | Baarman |
| 2004/0150934 A1 | 8/2004 | Baarman |
| 2004/0176107 A1 | 9/2004 | Chadha |
| 2004/0193499 A1 | 9/2004 | Ortiz et al. |
| 2004/0207522 A1 | 10/2004 | McGee et al. |
| 2004/0222751 A1 | 11/2004 | Mollema et al. |
| 2004/0232845 A1 | 11/2004 | Baarman et al. |
| 2004/0259499 A1 | 12/2004 | Oba et al. |
| 2004/0266362 A1 | 12/2004 | Watkins et al. |
| 2004/0267730 A1 | 12/2004 | Dumais et al. |
| 2004/0268265 A1 | 12/2004 | Berger |
| 2005/0007067 A1 | 1/2005 | Baarman et al. |
| 2005/0012611 A1 | 1/2005 | Osman |
| 2005/0027702 A1 | 2/2005 | Jensen et al. |
| 2005/0033780 A1 | 2/2005 | Simelius et al. |
| 2005/0041618 A1* | 2/2005 | Wei et al. ............... 370/328 |
| 2005/0091272 A1 | 4/2005 | Smith et al. |
| 2005/0093475 A1 | 5/2005 | Kuennen et al. |
| 2005/0116650 A1 | 6/2005 | Baarman |
| 2005/0122058 A1 | 6/2005 | Baarman et al. |
| 2005/0122059 A1 | 6/2005 | Baarman et al. |
| 2005/0127849 A1 | 6/2005 | Baarman et al. |
| 2005/0127850 A1 | 6/2005 | Baarman et al. |
| 2005/0135292 A1 | 6/2005 | Graumann |
| 2005/0157173 A1 | 7/2005 | Kurebayashi et al. |
| 2005/0171933 A1 | 8/2005 | Stepanich et al. |
| 2005/0227711 A1 | 10/2005 | Orwant et al. |
| 2005/0246396 A1 | 11/2005 | Oreizy et al. |
| 2005/0273459 A1 | 12/2005 | Moore et al. |
| 2006/0004512 A1 | 1/2006 | Herbst et al. |
| 2006/0035632 A1 | 2/2006 | Sorvari et al. |
| 2006/0041420 A1 | 2/2006 | Martin et al. |
| 2006/0061488 A1 | 3/2006 | Dunton |
| 2006/0061958 A1 | 3/2006 | Solomon et al. |
| 2006/0095348 A1 | 5/2006 | Jones et al. |
| 2006/0123055 A1 | 6/2006 | Atkinson et al. |
| 2006/0129533 A1 | 6/2006 | Purvis |
| 2006/0132045 A1 | 6/2006 | Baarman |
| 2006/0136129 A1 | 6/2006 | Yokozawa |
| 2006/0155466 A1 | 7/2006 | Kanda et al. |
| 2006/0181510 A1 | 8/2006 | Faith |
| 2006/0187049 A1 | 8/2006 | Moser et al. |
| 2006/0200556 A1 | 9/2006 | Brave et al. |
| 2006/0211430 A1 | 9/2006 | Persico |
| 2006/0294025 A1 | 12/2006 | Mengerlink |
| 2007/0035917 A1 | 2/2007 | Hoteling et al. |
| 2007/0061197 A1 | 3/2007 | Ramer et al. |
| 2007/0064406 A1 | 3/2007 | Beart |
| 2007/0077889 A1 | 4/2007 | Blight et al. |
| 2007/0088497 A1 | 4/2007 | Jung |
| 2007/0091861 A1 | 4/2007 | Gupta et al. |
| 2007/0120752 A1 | 5/2007 | Takasu |
| 2007/0149208 A1 | 6/2007 | Syrbe et al. |
| 2007/0182367 A1 | 8/2007 | Partovi |
| 2007/0185980 A1 | 8/2007 | Abraham et al. |
| 2007/0188284 A1 | 8/2007 | Dobbs |
| 2007/0192277 A1 | 8/2007 | Jackson |
| 2007/0200732 A1 | 8/2007 | Bachmaier |
| 2007/0202886 A1 | 8/2007 | Dhebri et al. |
| 2007/0225004 A1 | 9/2007 | Tang et al. |
| 2007/0246546 A1 | 10/2007 | Yoshida |
| 2007/0268392 A1 | 11/2007 | Paalasmaa et al. |
| 2007/0271367 A1 | 11/2007 | Yardeni et al. |
| 2007/0290654 A1 | 12/2007 | Govari et al. |
| 2007/0298715 A1 | 12/2007 | Blight et al. |
| 2008/0020786 A1 | 1/2008 | Smith et al. |
| 2008/0021637 A1 | 1/2008 | Staton et al. |
| 2008/0036653 A1 | 2/2008 | Huston |
| 2008/0045173 A1 | 2/2008 | Park et al. |
| 2008/0045236 A1 | 2/2008 | Nahon et al. |
| 2008/0102786 A1 | 5/2008 | Griffin |
| 2008/0125102 A1 | 5/2008 | Abel et al. |
| 2008/0133918 A1 | 6/2008 | You et al. |
| 2008/0134030 A1 | 6/2008 | Kansal et al. |
| 2008/0195312 A1 | 8/2008 | Aaron et al. |
| 2008/0196086 A1 | 8/2008 | Shintani et al. |
| 2008/0231537 A1 | 9/2008 | Rofougaran et al. |
| 2008/0248815 A1 | 10/2008 | Busch |
| 2008/0254811 A1 | 10/2008 | Stewart |
| 2008/0278894 A1 | 11/2008 | Chen et al. |
| 2008/0287160 A1* | 11/2008 | Sasai et al. ............... 455/556.2 |
| 2009/0001932 A1 | 1/2009 | Kamijo et al. |
| 2009/0001941 A1 | 1/2009 | Hsu et al. |
| 2009/0002394 A1 | 1/2009 | Chen et al. |
| 2009/0008148 A1 | 1/2009 | Mashino |
| 2009/0043504 A1 | 2/2009 | Bandyopadhyay et al. |
| 2009/0046654 A1* | 2/2009 | Hoshi et al. ............... 370/331 |
| 2009/0061870 A1 | 3/2009 | Finkelstein et al. |
| 2009/0069869 A1 | 3/2009 | Stouffer et al. |
| 2009/0088077 A1 | 4/2009 | Brown et al. |
| 2009/0098903 A1 | 4/2009 | Donaldson et al. |
| 2009/0106567 A1 | 4/2009 | Baarman |
| 2009/0170433 A1 | 7/2009 | Rhodes et al. |
| 2009/0212637 A1 | 8/2009 | Baarman et al. |
| 2009/0212737 A1 | 8/2009 | Johnson et al. |
| 2009/0298511 A1 | 12/2009 | Paulson |
| 2010/0007449 A1 | 1/2010 | Tait et al. |
| 2010/0021176 A1 | 1/2010 | Holcombe et al. |
| 2010/0045269 A1 | 2/2010 | LaFranchise et al. |
| 2010/0070219 A1 | 3/2010 | Azancot et al. |
| 2010/0076524 A1 | 3/2010 | Forsberg et al. |
| 2010/0081377 A1 | 4/2010 | Corbridge et al. |
| 2010/0081473 A1 | 4/2010 | Chatterjee et al. |
| 2010/0081483 A1 | 4/2010 | Chatterjee et al. |
| 2010/0083012 A1 | 4/2010 | Corbridge et al. |
| 2010/0121965 A1 | 5/2010 | Chatterjee et al. |
| 2010/0131443 A1 | 5/2010 | Agarwal et al. |
| 2010/0131691 A1 | 5/2010 | Chatterjee et al. |
| 2010/0146308 A1 | 6/2010 | Gioscia et al. |
| 2010/0150073 A1* | 6/2010 | Sasao ............... 370/328 |
| 2010/0156193 A1 | 6/2010 | Rhodes et al. |
| 2010/0161506 A1 | 6/2010 | Bosenick et al. |
| 2010/0169153 A1 | 7/2010 | Hwacinski et al. |
| 2010/0172090 A1 | 7/2010 | Chatterjee |

(56) References Cited

U.S. PATENT DOCUMENTS

| | | | |
|---|---|---|---|
| 2010/0177476 A1 | 7/2010 | Hotelling et al. | |
| 2010/0180001 A1 | 7/2010 | Hardt | |
| 2010/0194336 A1 | 8/2010 | Azancot et al. | |
| 2010/0285817 A1* | 11/2010 | Zhao et al. | 455/456.3 |
| 2010/0321321 A1 | 12/2010 | Shenfield et al. | |
| 2011/0018356 A1 | 1/2011 | Chatterjee | |
| 2011/0022350 A1 | 1/2011 | Chatterjee | |
| 2011/0037321 A1 | 2/2011 | Chatterjee | |
| 2011/0050503 A1* | 3/2011 | Fong et al. | 342/451 |
| 2011/0106954 A1 | 5/2011 | Chatterjee et al. | |
| 2011/0143772 A1* | 6/2011 | Sridhara et al. | 455/456.1 |
| 2011/0270836 A1 | 11/2011 | Yang et al. | |
| 2012/0030525 A1 | 2/2012 | Horstemeyer | |
| 2013/0166200 A1 | 6/2013 | Dhanani et al. | |

FOREIGN PATENT DOCUMENTS

| | | |
|---|---|---|
| CN | 101185006 A | 5/2008 |
| CN | 101317485 | 12/2008 |
| DE | 102005013541 A1 | 9/2006 |
| EP | 395469 A2 | 10/1990 |
| EP | 1487184 A1 | 12/2004 |
| EP | 1494488 | 1/2005 |
| FR | 2601161 A1 | 1/1988 |
| GB | 2389720 B | 9/2005 |
| GB | 2399466 B | 11/2005 |
| GB | 2389767 B | 4/2006 |
| JP | 09-259241 A | 10/1997 |
| JP | 11-143600 A | 5/1999 |
| JP | 11-354348 A | 12/1999 |
| JP | 3161388 B2 | 2/2001 |
| JP | 2004153593 | 5/2004 |
| KR | 2001109963 | 12/2001 |
| KR | 10-2005-0016840 A | 2/2005 |
| KR | 10-2005-0032997 A | 4/2005 |
| KR | 2005087189 | 8/2005 |
| KR | 10-2005-0095477 | 9/2005 |
| KR | 200608100 | 1/2006 |
| KR | 10-2006-0096509 | 9/2006 |
| KR | 10-2008-0003546 A | 1/2008 |
| KR | 10-0836634 B1 | 6/2008 |
| KR | 10-2008-0078024 A | 8/2008 |
| WO | WO-95/03686 A1 | 2/1995 |
| WO | WO-2005/024865 A2 | 3/1995 |
| WO | WO-2004/098079 A1 | 11/2004 |
| WO | WO-2007/033358 A2 | 3/2007 |
| WO | WO-2007/034421 A2 | 3/2007 |
| WO | WO-2007/080473 A1 | 7/2007 |
| WO | WO-2007/118125 | 10/2007 |
| WO | WO-2008/027836 | 3/2008 |
| WO | WO-2008/033670 A2 | 3/2008 |
| WO | WO-2008/044875 A1 | 4/2008 |
| WO | WO-2008/076526 A1 | 6/2008 |
| WO | WO-2008/133806 A1 | 11/2008 |
| WO | WO-2009/057771 A1 | 5/2009 |
| WO | WO-2010/005324 A1 | 1/2010 |
| WO | WO-2010/018903 A1 | 2/2010 |
| WO | WO-2010/062198 A1 | 6/2010 |
| WO | WO-2010/068062 A2 | 6/2010 |
| WO | WO-2010/068062 A3 | 7/2010 |
| WO | WO-2010/091269 A1 | 8/2010 |

OTHER PUBLICATIONS

U.S. Appl. No. 12/975,335, filed Dec. 21, 2010, Oh, et al.
U.S. Appl. No. 12/987,940, filed Jan. 10, 2011, Chatterjee, et al.
U.S. Appl. No. 29/323,688, filed Aug. 28, 2008, Matsuoka, et al.
"New Riverside University Dictionary", published by The Riverside Publishing Company, Copyright 1984 by Houghton Mifflin Company, 3 pages.
Bolter, David J. and MacIntyre, Blair, "Is It Live Or Is It AR?", IEEE Spectrum, Aug. 2007, pp. 30-35.
EP Office Action received in EP Application No. 06850401.8; Mailed Feb. 3, 2012, pp. 8.
EP Search Report received in EP Application No. 06850401.8, Mailed Apr. 18, 2011, pp. 8.
Fasbender, A. et al., "Any Network, Any Terminal, Anywhere", IEEE Personal Communications (Apr. 1999), pp. 22-30, IEEE Press.
Final Office Action dated Jan. 11, 2010 in U.S. Appl. No. 11/680,603, 24 pages.
Final Office Action mailed Jan. 8, 2009 in U.S. Appl. No. 11/430,786.
Final Office Action mailed Oct. 25, 2004 in U.S. Appl. No. 09/861,276; 10 pgs.
Final Office Action mailed Dec. 30, 2009 in U.S. Appl. No. 11/430,786.
Final Office Action mailed Jul. 19, 2010 in U.S. Appl. No. 11/430,786.
Final Office Action mailed Jul. 9, 2007 in U.S. Appl. No. 11/430,786.
Free Online Dictionary.com, Prioritize, 1991, p. 1-2. http//www.thefreedictionary.com/prioritize.
International Search Report and Writen Opinion dated Nov. 22, 2011 in International Application No. PCT/US2011/029844.
International Search Report and Writen Opinion dated Dec. 28, 2011 in International Application No. PCT/US2011/038729.
International Search Report and Writen Opinion dated Feb. 23, 2011 in International Application No. PCT/US2010/042779.
International Search Report and Writen Opinion dated Feb. 27, 2012 in International Application No. PCT/US2011/053856.
International Search Report and Writen Opinion dated Aug. 31, 2010 in International Application No. PCT/US2010/020054.
International Search Report and Written established by International Searching Authority, PCT/US2006/062371, Feb. 20, 2008, 10 pgs.
International Search Report and Written Opinion dated Apr. 20, 2010 in International Application No. PCT/US2009/055928.
International Search Report and Written Opinion dated Jul. 21, 2010 in International Application No. PCT/US2009/068328.
International Search Report and Written Opinion dated Jul. 28, 2010 in International Application No. PCT/US2009/068332.
International Search Report and Written Opinion dated Aug. 20, 2010 in International Application No. PCT/US2009/069847.
International Search Report and Written Opinion for International Application No. PCT/US2008/071324, mail date Oct. 22, 2008, 7 pages.
International Search Report and Written Opinion from International Application No. PCT/US2009/045387 dated Feb. 17, 2010, 8 pages.
Jing, J., et al., "Client Server Computing in Mobile Environments", ACM Computing Surveys, (Jun. 1999), pp. 117-157, vol. 31, Issue 2, ACM Press.
Kean, Steven, "Powermat Portable Wireless Charging Mat", pp. 1-2 dwnloaded from http://www.bigbruin.com/contentlpowermat_1 on Sep. 29, 2010.
Liang, et al., "An Implantable Bi-Directional Wireless Transmission System For Transcutanteous Biological Signal Recording," Physiol. Meas. 26:83-97 (2005).
Non-Final Office Action dated Jul. 7, 2010 in U.S. Appl. No. 11/680,603, 24 pages.
Non-Final Office Action dated Dec. 7, 2010 in U.S. Appl. No. 11/680,603; 26 pages.
Non-Final Office Action dated May 13, 2009 in U.S. Appl. No. 11/680,603, 30pgs.
Non-Final Office Action dated Sep. 1, 2009 for U.S. Appl. No. 11/890,794, 17 pages.
Non-Final Office Action mailed Jan. 25, 2008 in U.S. Appl. No. 11/430,786.
Non-Final Office Action mailed Oct. 5, 2006 in U.S. Appl. No. 11/430,786.
Non-Final Office Action mailed Nov. 13, 2010 in U.S. Appl. No. 12/478,616; 12 pgs.
Non-Final Office Action mailed Nov. 3, 2010 in U.S. Appl. No. 12/478,616;12 pgs.
Non-Final Office Action mailed Mar. 24, 2010 in U.S. Appl. No. 11/430,786.
Non-Final Office Action mailed Apr. 22, 2004 in U.S. Appl. No. 09/861,276; 7pgs.
Non-Final Office Action mailed Apr. 7, 2005 in U.S. Appl. No. 09/861,276; 11 pgs.

(56) References Cited

OTHER PUBLICATIONS

Non-Final Office Action mailed Jun. 11, 2009 in U.S. Appl. No. 11/430,786.
Non-Final Office Action mailed Jul. 25, 2008 in U.S. Appl. No. 11/430,786.
Non-Final Office Action mailed Sep. 30, 2010 in U.S. Appl. No. 11/430,786; 7 pgs.
Notice of Allowance for U.S. Appl. No. 11/706,872, mail date Dec. 27, 2010,7 pages.
Notice of Allowance mailed Jan. 9, 2006 in U.S. Appl. No. 09/861,276; 12 pgs.
Office Action for U.S. Appl. No. 11/706,872, mail date Apr. 26, 2010, 8 pages.
Office Action for U.S. Appl. No. 11/706,872, mail date Aug. 5, 2010, 9 pages.
Office Action for U.S. Appl. No. 11/706,872, mail date Nov. 3, 2009, 9 pages.
Office Action for U.S. Appl. No. 11/823,850, mail date Apr. 27, 2009, 14 pages.
Office Action for U.S. Appl. No. 11/823,850, mail date Jul. 21, 2010, 17 pages.
Office Action for U.S. Appl. No. 11/823,850, mail date Nov. 23, 2009, 15 pages.
Office Action for U.S. Appl. No. 11/890,794, mail date Mar. 10, 2010, 17 pages.
Office Action for U.S. Appl. No. 12/167,137, mail date Nov. 8, 2010, 8 pages.
Office Action for U.S. Appl. No. 12/535,841, mail date May 13, 2010, 15 pages.
Office Action for U.S. Appl. No. 12/535,841, mail date Oct. 19, 2010, 13 pages.
Office Action for U.S. Appl. No. 12/581,038, mail date Nov. 15, 2010, 11 pages.
Office Action for U.S. Appl. No. 11/890,794, mail date Jul. 19, 2010, 11 pages.
Opticon Users manual DWT 7133, Nov. 2000.
Skyhook Wireless, "How It Works", printed from internet address: http://developer.skyhookwireless.com/how-it-works/, on Apr. 12, 2007, 2 pages.
Stein, Augmented reality: iPhone 3G S killer app?, printed from Internet address: http://news.cnet.com/8301-17938_105-10266380-1.html on Dec. 9, 2009, 3 pages.
Troy Saulnier, Andre Trudel and Jason Zwicker, "A dynamic intelligent frequency based search engine," Nov. 1999.
US Office Action for U.S. Appl. No. 11/890,794, mail date Sep. 1, 2009, 15 pages.
Digital Cellular Telecommunications System (phase 2+ ); AT Command Set for GSM Mobile Equipment (ME) (GSM 07.07 version 7.4.0 Release 1998), ETSI TS 100 916 V7 40 (Nov. 1999) 126 pages. Available at website.
Digital Cellular Telecommunications System (phase 2+ ); General Description of a GSM Public Land Mobile Network (PLMN) (GSM 01.02 version 6.0.1 Release 1997), ETSI TS 101 622 V6 01 (Feb. 2001) 23 pages. Available at website.
Digital Cellular Telecommunications System (phase 2+ ); Specification of the SIM Application Toolkit for the Subscriber Identity Module—Mobile Equipment (SIM—ME) interface (GSM 11 14 Version 530. Available at website.
Hadjiefthymiades, S. et al., "ESW4: enhanced scheme for WWW computing in wireless communication environments", ACM SIGCOMM Computer Communication Review (Oct. 1999) pp. 34-35 vol. 29 Issue 5 ACM Press.
Hui, et al., "A New Generation of Universal Contactless Battery Contactless Battery Charging Platform for Portable Consumer Electronic Equipment," IEEE Trans Power Electronics, 20(3):620-627(2005).
Mel B. W. et al., "Tablet: Personal Computer in the Year 2000", Communications of the Association for Computing machinery, New Your, NY vol. 31, No. 6, Jun. 1, 1988, 639-646 XP000047633ISSN: 0001-0782.
Palm™ m505 Handheld, printed from internet address: http:/www.palm.com/products/palmm505/ on Sep. 20, 2001.
Sevanto, J. et al., "Introducing quality-of-service and traffic classes in wireless mobile networks", Proceedings of the 1 st ACM International workshop on Wireless mobile multimedia (1999) pp. 21-29 ACM Press.
Troy Saulnier. Andre Trudel and Jason Zwicker, "A dynamic intelligent frequency based search engine," Nov. 1999.
CN Application No. 201010521025.8, Search Report mailed on Jul. 4, 2013, 2 pages.
International Application No. PCT/US2011/053856, International Preliminary Report on Patentability mailed on Apr. 2, 2013, 4 pages.
U.S. Appl. No. 12/549,249, Non-Final Office Action mailed on Aug. 17, 2011, 7 pages.
U.S. Appl. No. 12/549,249, Notice of Allowance mailed on Jan. 27, 2012, 5 pages.
U.S. Appl. No. 12/549,249, Notice of Allowance mailed on Jul. 2, 2012, 2 pages.
U.S. Appl. No. 12/893,907, Non-Final Office Action mailed on May 25, 2012, 6 pages.
U.S. Appl. No. 12/893,907, Notice of Allowance mailed on Nov. 21, 2012, 7 pages.

* cited by examiner

USE OF WIRELESS ACCESS POINT ID FOR POSITION DETERMINATION

BACKGROUND

Some mobile computing devices provide location-based services to a user. For example, a mobile computing device may use a navigation application to provide directions from the user's current location to a desired destination. A location-determining circuit or system may be used to periodically determine the location of the mobile computing device.

Mobile computing devices may also have wireless transceivers configured to communicate with various types of wireless devices over various types of wireless networks.

DETAILED DESCRIPTION

Figure 1:
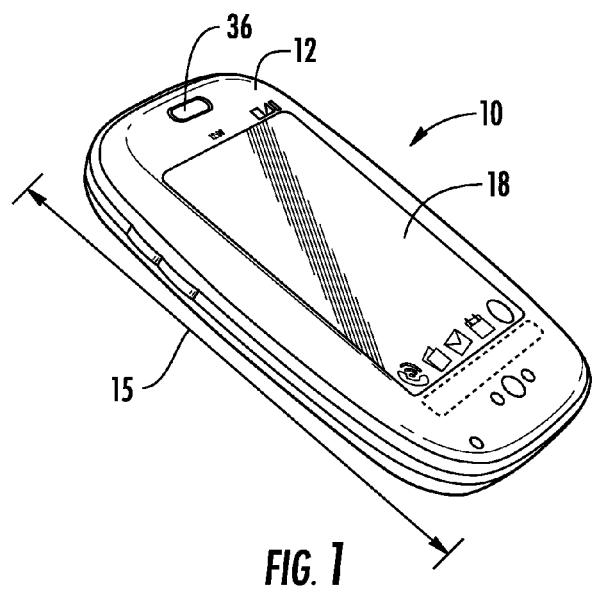
FIG. 1 is a perspective view of a mobile computing device according to an exemplary embodiment.

Some embodiments described herein may reduce the power consumption of a mobile computing device by reducing the activity of location determination circuitry based on one or more factors. Some embodiments described herein may use location-related data such as a current location, a desired or future location, the presence of wireless access points.

Referring to FIGS. 1-4, a mobile device 10 is shown. The teachings herein can be applied to device 10 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 10 may be a smartphone, which is a combination mobile telephone and handheld computer having PDA functionality. PDA functionality can comprise one or more of personal information management (e.g., including personal data applications such as email, calendar, contacts, etc.), database functions, word processing, spreadsheets, voice memo recording, Global Positioning System (GPS) functionality, etc. Device 10 may be configured to synchronize personal information from these applications with a computer (e.g., a desktop, laptop, server, etc.). Device 10 may be further configured to receive and operate additional applications provided to device 10 after manufacture, e.g., via wired or wireless download, SecureDigital card, etc.

As shown in FIGS. 1-4, device 10 includes a housing 12 and a front 14 and a back 16. Device 10 further comprises a display 18 and a user input device 20 (e.g., a QWERTY keyboard, buttons, touch screen, speech recognition engine, etc.). Display 18 may comprise a touch screen display in order to provide user input to a processing circuit 101 (see FIG. 4) to control functions, such as to select options displayed on display 18, enter text input to device 10, or enter other types of input. Display 18 also provides images (see, e.g., FIG. 5) that are displayed and may be viewed by users of device 10. User input device 20 can provide similar inputs as those of touch screen display 18. An input button 40 may be provided on front 14 and may be configured to perform pre-programmed functions. Device 10 can further comprise a speaker 26, a stylus (not shown) to assist the user in making selections on display 18, a camera 28, a camera flash 32, a microphone 34, and an earpiece 36. Display 18 may comprise a capacitive touch screen, a mutual capacitance touch screen, a self capacitance touch screen, a resistive touch screen, a touch screen using cameras and light such as a surface multi-touch screen, proximity sensors, or other touch screen technologies, and so on. Display 18 may be configured to receive inputs from finger touches at a plurality of locations on display 18 at the same time. Display 18 may be configured to receive a finger swipe or other directional input, which may be interpreted by a processing circuit to control certain functions distinct from a single touch input. Further, a gesture area 30 may be provided adjacent (e.g., below, above, to a side, etc.) or be incorporated into display 18 to receive various gestures as inputs, including taps, swipes, drags, flips, pinches, and so on. One or more indicator areas 38 (e.g., lights, etc.) may be provided to indicate that a gesture has been received from a user.

According to an exemplary embodiment, housing 12 is configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment.

Figure 2:
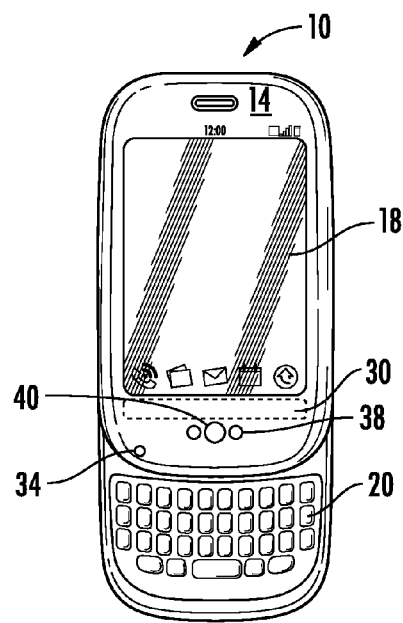
FIG. 2 is a front view of the mobile computing device of FIG. 1 in an extended configuration according to an exemplary embodiment.
Figure 3:
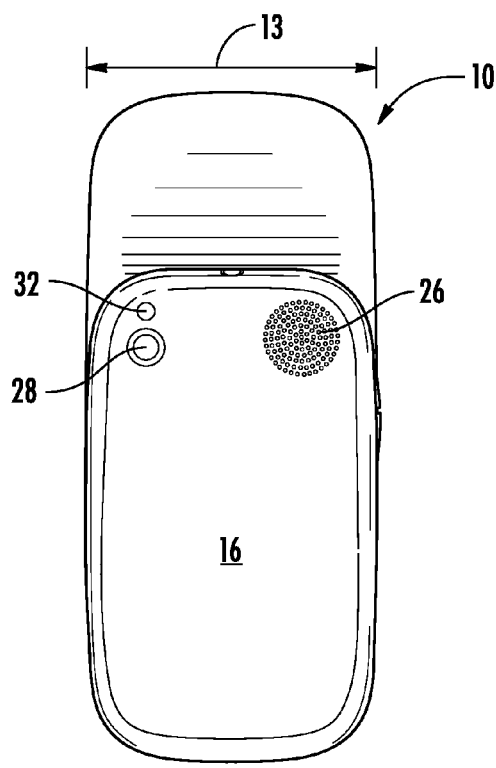
FIG. 3 is a back view of the mobile computing device of FIG. 1 in an extended configuration according to an exemplary embodiment.
Figure 4:
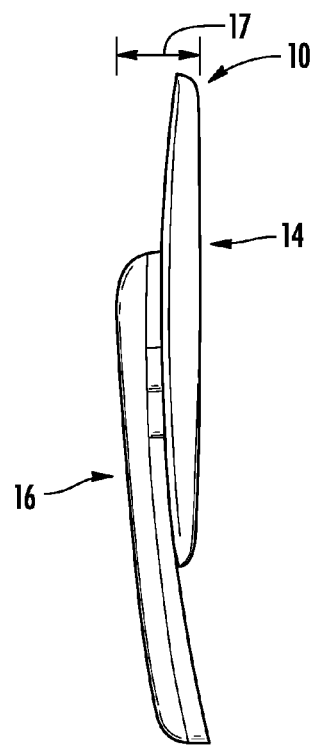
FIG. 4 is a side view of the mobile computing device of FIG. 1 in an extended configuration according to an exemplary embodiment

Device 10 may be a handheld computer, which is a computer small enough to be carried in a hand of a user, comprising such devices as typical mobile telephones and personal digital assistants, but excluding typical laptop computers and tablet PCs. The various input devices and other components of device 10 as described below may be positioned anywhere on device 10 (e.g., the front surface shown in FIG. 2, the rear surface shown in FIG. 3, the side surfaces as shown in FIG. 4, etc.). Furthermore, various components such as a keyboard etc. may be retractable to slide in and out from a portion of device 10 to be revealed along any of the sides of device 10, etc. For example, as shown in FIGS. 2-4, front 14 may be slidably adjustable relative to back 16 to reveal input device 20, such that in a retracted configuration (see FIG. 1) input device 20 is not visible, and in an extended configuration (see FIGS. 2-4) input device 20 is visible.

According to various exemplary embodiments, housing 12 may be any size, shape, and have a variety of length, width, thickness, and volume dimensions. For example, width 13 may be no more than about 200 millimeters (mm), 100 mm, 85 mm, or 65 mm, or alternatively, at least about 30 mm, 50 mm, or 55 mm. Length 15 may be no more than about 200 mm, 150 mm, 135 mm, or 125 mm, or alternatively, at least about 70 mm or 100 mm. Thickness 17 may be no more than about 150 mm, 50 mm, 25 mm, or 15 mm, or alternatively, at least about 10 mm, 15 mm, or 50 mm. The volume of housing 12 may be no more than about 2500 cubic centimeters (cc) or 1500 cc, or alternatively, at least about 1000 cc or 600 cc.

Device 10 may provide voice communications functionality in accordance with different types of cellular radiotelephone systems. Examples of cellular radiotelephone systems may include Code Division Multiple Access (CDMA) cellular radiotelephone communication systems, Global System for Mobile Communications (GSM) cellular radiotelephone systems, etc.

In addition to voice communications functionality, device 10 may be configured to provide data communications functionality in accordance with different types of cellular radiotelephone systems. Examples of cellular radiotelephone systems offering data communications services may include GSM with General Packet Radio Service (GPRS) systems (GSM/GPRS), CDMA/1xRTT systems, Enhanced Data Rates for Global Evolution (EDGE) systems, Evolution Data Only or Evolution Data Optimized (EV-DO) systems, Long Term Evolution (LTE) systems, etc.

Device 10 may be configured to provide voice and/or data communications functionality in accordance with different types of wireless network systems. Examples of wireless network systems may further include a wireless local area network (WLAN) system, wireless metropolitan area network (WMAN) system, wireless wide area network (WWAN) system, and so forth. Examples of suitable wireless network systems offering data communication services may include the Institute of Electrical and Electronics Engineers (IEEE) 802.xx series of protocols, such as the IEEE 802.11a/b/g/n series of standard protocols and variants (also referred to as "WiFi"), the IEEE 802.16 series of standard protocols and variants (also referred to as "WiMAX"), the IEEE 802.20 series of standard protocols and variants, and so forth.

Device 10 may be configured to perform data communications in accordance with different types of shorter range wireless systems, such as a wireless personal area network (PAN) system. One example of a suitable wireless PAN system offering data communication services may include a Bluetooth system operating in accordance with the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles, and so forth.

Figure 5:
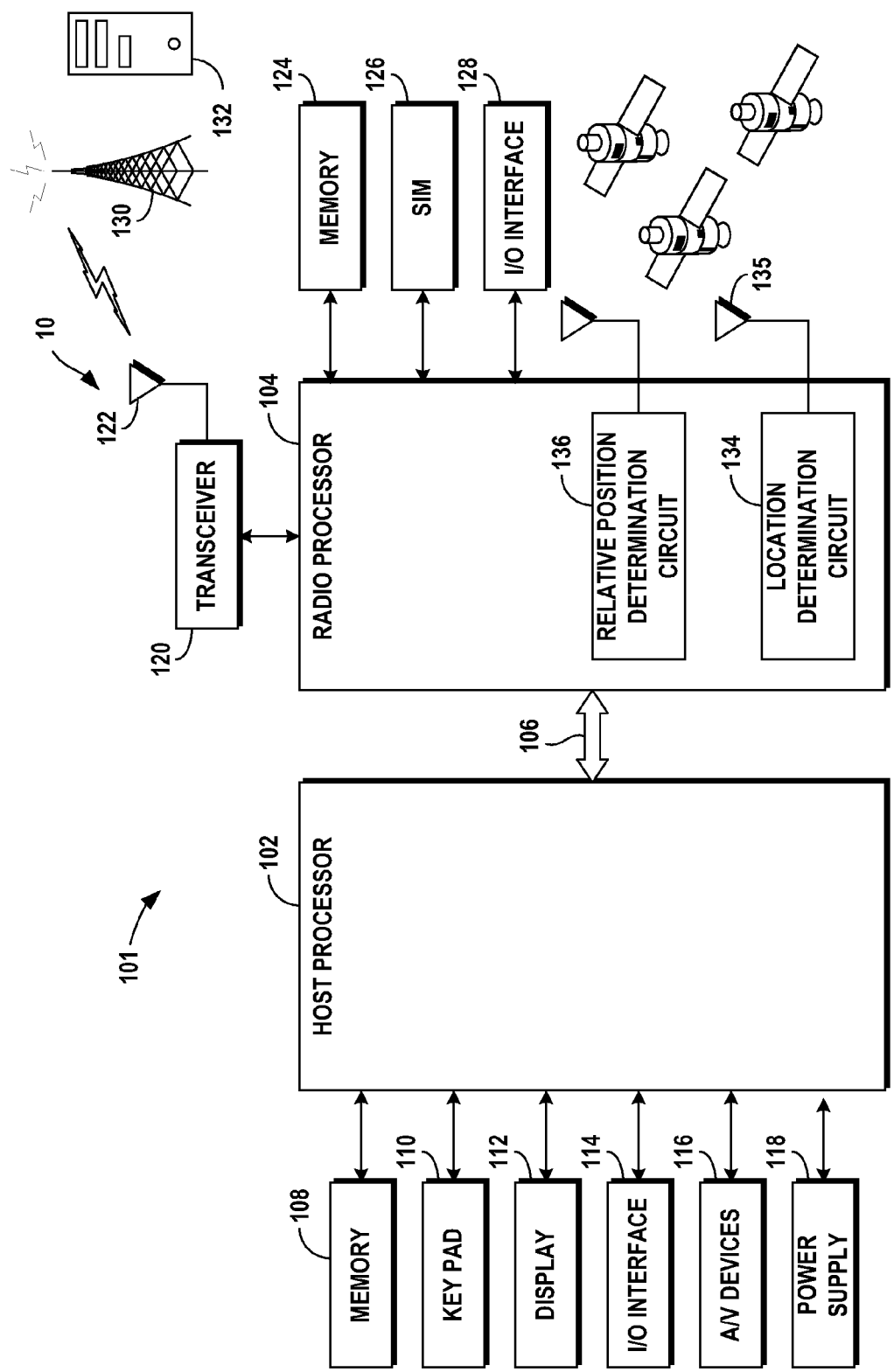
FIG. 5 is a block diagram of the mobile computing device of FIG. 1 according to an exemplary embodiment.

As shown in the embodiment of FIG. 5, device 10 may comprise a processing circuit having a dual- or multi-processor architecture including a host processor 102 and a radio processor 104 (e.g., a base band processor). Host processor 102 and radio processor 104 may be distinct, separate or different chips, integrated circuit packages, parts or components. The host processor 102 and the radio processor 104 may be configured to communicate with each other using interfaces 106 such as one or more universal serial bus (USB) interfaces, micro-USB interfaces, universal asynchronous receiver-transmitter (UART) interfaces, general purpose input/output (GPIO) interfaces, control/status lines, control/data lines, shared memory, and so forth. Alternatively, the processing circuit may comprise one processor, more than two processors, and/or other analog and/or digital circuit components configured to or programmed to operate as described herein with respect to the various embodiments.

The host processor 102 may be responsible for executing various software programs such as application programs and system programs to provide computing and processing operations for device 10. The radio processor 104 may be responsible for performing various voice and data communications operations for device 10 such as transmitting and receiving voice and data information over one or more wireless communications channels. Although embodiments of the dual processor architecture may be described as comprising the host processor 102 and the radio processor 104 for purposes of illustration, the dual processor architecture of device 10 may comprise additional processors, may be implemented as a dual- or multi-core chip with both host processor 102 and radio processor 104 as distinct processing components fabricated on a single chip, etc.

In various embodiments, the host processor 102 may be implemented as a host central processing unit (CPU) using any suitable processor or logic device, such as a general purpose processor. The host processor 102 may comprise, or be implemented as, a chip multiprocessor (CMP), dedicated processor, embedded processor, media processor, input/output (I/O) processor, co-processor, a field programmable gate array (FPGA), a programmable logic device (PLD), or other processing device in alternative embodiments. In an exemplary embodiment, host processor 102 is an OMAP2, such as an OMAP2431 processor, manufactured by Texas Instruments, Inc.

The host processor 102 may be configured to provide processing or computing resources to device 10. For example, the host processor 102 may be responsible for executing various software programs such as application programs and system programs to provide computing and processing operations for device 10. Examples of application programs may include, for example, a telephone application, voicemail application, e-mail application, instant message (IM) application, short message service (SMS) application, multimedia message service (MMS) application, web browser application, personal information manager (PIM) application, contact management application, calendar application, scheduling application, task management application, word processing application, spreadsheet application, database application, video player application, audio player application, multimedia player application, digital camera application, video camera application, media management application, a gaming application, and so forth. The application software may provide a graphical user interface (GUI) to communicate information between device 10 and a user.

System programs assist in the running of a computer system. System programs may be directly responsible for controlling, integrating, and managing the individual hardware components of the computer system. Examples of system programs may include, for example, an operating system (OS), device drivers, programming tools, utility programs, software libraries, an application programming interface (API), graphical user interface (GUI), and so forth. Device 10 may utilize any suitable OS in accordance with the described embodiments such as a Palm WebOS, Palm OS®, Palm OS® Cobalt, Microsoft® Windows OS, Microsoft Windows® CE, Microsoft Pocket PC, Microsoft Mobile, Symbian OS™, Embedix OS, Linux, Binary Run-time Environment for Wireless (BREW) OS, JavaOS, a Wireless Application Protocol (WAP) OS, and so forth.

Device 10 may comprise a memory 108 coupled to the host processor 102. In various embodiments, the memory 108 may be configured to store one or more software programs to be executed by the host processor 102. The memory 108 may be implemented using any machine-readable or computer-readable media capable of storing data such as volatile memory or non-volatile memory, removable or non-removable memory, erasable or non-erasable memory, writeable or re-writeable memory, and so forth. Examples of machine-readable storage media may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), electrically erasable programmable ROM (EEPROM), flash memory (e.g., NOR or NAND flash memory), or any other type of media suitable for storing information.

Although the memory 108 may be shown as being separate from the host processor 102 for purposes of illustration, in various embodiments some portion or the entire memory 108 may be included on the same integrated circuit as the host processor 102. Alternatively, some portion or the entire memory 108 may be disposed on an integrated circuit or other medium (e.g., hard disk drive) external to the integrated circuit of host processor 102. In various embodiments, device 10 may comprise an expansion slot to support a multimedia and/or memory card, for example.

Device 10 may comprise a user input device 110 coupled to the host processor 102. The user input device 110 may comprise, for example, a QWERTY key layout and an integrated number dial pad. Device 10 also may comprise various keys, buttons, and switches such as, for example, input keys, preset and programmable hot keys, left and right action buttons, a navigation button such as a multidirectional navigation button, phone/send and power/end buttons, preset and programmable shortcut buttons, a volume rocker switch, a ringer on/off switch having a vibrate mode, a keypad, an alphanumeric keypad, and so forth.

The host processor 102 may be coupled to a display 112. The display 112 may comprise any suitable visual interface for displaying content to a user of device 10. For example, the display 112 may be implemented by a liquid crystal display (LCD) such as a touch-sensitive color (e.g., 16-bit color) thin-film transistor (TFT) LCD screen. In some embodiments, the touch-sensitive LCD may be used with a stylus and/or a handwriting recognizer program.

Device 10 may comprise an input/output (I/O) interface 114 coupled to the host processor 102. The I/O interface 114 may comprise one or more I/O devices such as a serial connection port, an infrared port, integrated Bluetooth® wireless capability, and/or integrated 802.11x (WiFi) wireless capability, to enable wired (e.g., USB cable) and/or wireless connection to a local computer system, such as a local personal computer (PC). In various implementations, device 10 may be configured to transfer and/or synchronize information with the local computer system.

The host processor 102 may be coupled to various audio/video (A/V) devices 116 that support A/V capability of device 10. Examples of A/V devices 116 may include, for example, a microphone, one or more speakers, an audio port to connect an audio headset, an audio coder/decoder (codec), an audio player, a digital camera, a video camera, a video codec, a video player, and so forth.

The host processor 102 may be coupled to a power supply 118 configured to supply and manage power to the elements of device 10. In various embodiments, the power supply 118 may be implemented by a rechargeable battery, such as a removable and rechargeable lithium ion battery to provide direct current (DC) power, and/or an alternating current (AC) adapter to draw power from a standard AC main power supply.

As mentioned above, the radio processor 104 may perform voice and/or data communication operations for device 10. For example, the radio processor 104 may be configured to communicate voice information and/or data information over one or more assigned frequency bands of a wireless communication channel. In various embodiments, the radio processor 104 may be implemented as a communications processor using any suitable processor or logic device, such as a modem processor or base band processor. Although some embodiments may be described with the radio processor 104 implemented as a modem processor or base band processor by way of example, it may be appreciated that the embodiments are not limited in this context. For example, the radio processor 104 may comprise, or be implemented as, a digital signal processor (DSP), media access control (MAC) processor, or any other type of communications processor in accordance with the described embodiments. Radio processor 104 may be any of a plurality of modems manufactured by Qualcomm, Inc. or other manufacturers.

In various embodiments, the radio processor 104 may perform analog and/or digital base band operations for device 10. For example, the radio processor 104 may perform digital-to-analog conversion (DAC), analog-to-digital conversion (ADC), modulation, demodulation, encoding, decoding, encryption, decryption, and so forth.

Device 10 may comprise a transceiver module 120 coupled to the radio processor 104. The transceiver module 120 may comprise one or more transceivers configured to communicate using different types of wireless access points using different protocols, communication ranges, operating power requirements, RF sub-bands, information types (e.g., voice or data), use scenarios, applications, and so forth. In various embodiments, the transceiver module 120 may comprise one or more transceivers configured to support voice communication for a cellular radiotelephone system such as a GSM, UMTS, CDMA, and/or LTE system. The transceiver module 120 also may comprise one or more transceivers configured to perform data communications in accordance with one or more wireless communications protocols such as WWAN protocols (e.g., GSM/GPRS protocols, CDMA/1xRTT protocols, EDGE protocols, EV-DO protocols, EV-DV protocols, HSDPA protocols, etc.), WLAN protocols (e.g., IEEE 802.11a/b/g/n, IEEE 802.16, IEEE 802.20, etc.), PAN protocols, Infrared protocols, Bluetooth protocols, EMI protocols including passive or active RFID protocols, and so forth.

The transceiver module 120 may be implemented using one or more chips as desired for a given implementation. Although the transceiver module 120 may be shown as being separate from and external to the radio processor 104 for purposes of illustration, in various embodiments some portion or the entire transceiver module 120 may be included on the same integrated circuit as the radio processor 104.

Device 10 may comprise an antenna system 122 for transmitting and/or receiving electrical signals. As shown, the antenna system 122 may be coupled to the radio processor 104 through the transceiver module 120. The antenna system 122 may comprise or be implemented as one or more internal antennas and/or external antennas.

Device 10 may comprise a memory 124 coupled to the radio processor 104. The memory 124 may be implemented using one or more types of machine-readable or computer-readable media capable of storing data such as volatile memory or non-volatile memory, removable or non-removable memory, erasable or non-erasable memory, writeable or re-writeable memory, etc. The memory 124 may comprise, for example, flash memory and secure digital (SD) RAM. Although the memory 124 may be shown as being separate from and external to the radio processor 104 for purposes of illustration, in various embodiments some portion or the entire memory 124 may be included on the same integrated circuit as the radio processor 104.

Device 10 may comprise a subscriber identity module (SIM) 126 coupled to the radio processor 104. The SIM 126 may comprise, for example, a removable or non-removable smart card configured to encrypt voice and data transmissions and to store user-specific data for allowing a voice or data communications network to identify and authenticate the user. The SIM 126 also may store data such as personal settings specific to the user.

Device 10 may comprise an I/O interface 128 coupled to the radio processor 104. The I/O interface 128 may comprise one or more I/O devices to enable wired (e.g., serial, cable, etc.) and/or wireless (e.g., WiFi, short range, etc.) communication between device 10 and one or more external computer systems.

In various embodiments, device 10 may comprise location or position determination capabilities. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFLT) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), etc.

Device 10 may be configured to operate in one or more location determination modes including, for example, a standalone mode, a mobile station (MS) assisted mode, and/or a MS-based mode. In a standalone mode, such as a standalone GPS mode, device 10 may be configured to determine its position without receiving wireless navigation data from the network, though it may receive certain types of position assist data, such as almanac, ephemeris, and coarse data. In a standalone mode, device 10 may comprise a local location determination circuit 134 (e.g., a GPS receiver) which may be integrated within housing 12 (FIG. 1) configured to receive satellite data via an antenna 135 and to calculate a position fix. Local location determination circuit may alternatively comprise a GPS receiver in a second housing separate from housing 12 but in the vicinity of device 10 and configured to communicate with device 10 wirelessly (e.g., via a PAN, such as Bluetooth). When operating in an MS-assisted mode or an MS-based mode, however, device 10 may be configured to communicate over a radio access network 130 (e.g., UMTS radio access network) with a remote computer 132 (e.g., a location determination entity (PDE), a location proxy server (LPS) and/or a mobile positioning center (MPC), etc.).

In an MS-assisted mode, such as an MS-assisted AGPS mode, the remote computer 132 may be configured to determine the position of the mobile computing device and provide wireless data comprising a position fix. In an MS-based mode, such as an MS-based AGPS mode, device 10 may be configured to determine its position using acquisition data or other wireless data from the remote computer 132. The acquisition data may be provided periodically. In various implementations, device 10 and the remote computer 132 may be configured to communicate according to a suitable MS-PDE protocol (e.g., MS-LPS or MS-MPC protocol) such as the TIA/EIA standard IS-801 message protocol for MS-assisted and MS-based sessions in a CDMA radiotelephone system.

When assisting the mobile computing device 10, the remote computer 132 may handle various processing operations and also may provide information to aid location determination. Examples of position assist data may include satellite-based measurements, terrestrial-based measurements, and/or system-based measurements such as satellite almanac information, GPS code phase measurements, ionospheric data, ephemeris data, time correction information, altitude estimates, timing offsets, forward/reverse link calibration, coarse data, and so forth.

In various implementations, the position assist data provided by the remote computer 132 may improve the speed of satellite acquisition and the probability of a position fix by concentrating the search for a GPS signal and/or may improve the accuracy of location determination. Each position fix or series of position fixes may be available at device 10 and/or at the remote computer 132 depending on the location determination mode. In some cases, data calls may be made and position assist data may be sent to device 10 from the remote computer 132 for every position fix (e.g., in an ad hoc mode). In other cases, data calls may be made and position assist data may be sent periodically and/or as needed.

In various embodiments, device 10 may comprise dedicated hardware circuits or structures, or a combination of dedicated hardware programmed with code, to support location determination. For example, the transceiver module 120 and the antenna system 122 may comprise GPS receiver or transceiver hardware and one or more associated antennas coupled to the radio processor 104 to support location determination.

The host processor 102 may comprise and/or implement at least one LBS (location-based service) application. In general, the LBS application may comprise any type of client application executed by the host processor 102, such as a GPS application, configured to communicate location requests (e.g., requests for position fixes) and location responses. Examples of LBS applications include, without limitation, wireless 911 emergency services, roadside assistance, asset tracking, fleet management, friends and family locator services, dating services, and navigation services which may provide the user with maps, directions, routing, traffic updates, mass transit schedules, information regarding local points-of-interest (POI) such as restaurants, hotels, landmarks, and entertainment venues, and other types of LBS services in accordance with the described embodiments.

The LBS application may be configured to send a location request in response to receiving input from device 10 or from a source external to device 10. For example, the user of device 10 may interact with a data input device to command the LBS application to send a location request. The LBS application also may send a location request in response to receiving input from an external network element or computing device that is attempting to locate the user of device 10. In some cases, the LBS application also may be configured to automatically, periodically, and/or autonomously send location requests.

Although other applications may operate without regard to the location of device 10, in various embodiments, the LBS application may request and receive position information to enhance the functionality of one or more of the other applications. For example, position information may be provided in conjunction with a messaging application to locate the sender or recipient of a message. Position information may be provided to a web browser application to generate directions to a location associated with a particular website. Positioning information may be provided to a personal management application to generate location-based alerts and/or directions to a meeting place.

The radio processor 104 may be configured to receive location requests from an LBS API handler on host processor 102 and may forward location responses to the LBS API handler for delivery to the LBS application through the LBS API. Radio processor 104 may be configured to communicate securely over a network with remote computer 132 (e.g., PDE, LPS or MPC) configured to provide authentication and authorization services and/or a variety of geo-services. For example, radio processor 104 may be configured to communicate with a PDE configured to verify privacy for location requests, allow authorized access to a location server, and provide various location server services. Radio processor 104 also may be configured to communicate with a PDE to request and receive geo-service information. Examples of geo-service information may include mapping information, routing information, geo-coding and reverse geo-coding information for addresses and coordinates, POI information, and so forth.

Radio processor 104 may be configured to invoke a position fix by configuring a position engine and requesting a position fix. For example, a position engine interface on radio processor 104 may set configuration parameters that control the location determination process. Examples of configuration parameters may include, without limitation, location determination mode (e.g., standalone, MS-assisted, MS-based), actual or estimated number of position fixes (e.g., single position fix, series of position fixes, request position assist data without a position fix), time interval between position fixes, Quality of Service (QoS) values, optimization parameters (e.g., optimized for speed, accuracy, or payload), PDE address (e.g., IP address and port number of LPS or MPC), etc.

Radio processor 104 also may set request/response parameters to request and return various types of position information. Examples of request/response parameters may include current location, latitude, longitude, altitude, heading, vector information such as horizontal and vertical velocity, sector-based position location, position fix method, level of accuracy, time offset, position uncertainty, device orientation, client initialization and registration, and so forth.

The radio processor 104 may comprise or implement a position engine such as a GPS engine. In various embodiments, the position engine may be configured to provide location determination capabilities for device 10. In some embodiments, the position engine may be implemented as software operating in conjunction with hardware (e.g., GPS receiver hardware) allowing device 10 to receive and process GPS satellites signals for location determination. In one embodiment, the position engine may be implemented as a QUALCOMM® gpsOne® engine.

In various implementations, the position engine may employ one or more location determination techniques such as GPS, CGI, CGI+TA, EFLT, TDOA, AOA, AFLT, OTDOA, EOTD, AGPS, GPS/AGPS, hybrid techniques, and so forth. The position engine also may be configured to operate in one or more location determination modes including a standalone mode, an MS-assisted mode, and an MS-based mode. The determined position information generated and/or obtained by the position engine generally may comprise any type of information associated with the location of device 10. Examples of position information may include, without limitation, current location, latitude, longitude, altitude, heading information, vector information such as horizontal and vertical velocity, sector-based position location, position fix information, position uncertainty, device orientation, and so forth.

In various embodiments, device 10 may be used in connection with a variety of applications that require determination of the location of device 10. For example, various navigation and mapping applications may be utilized to provide various types of data and information to users, including driving directions, map information, point of interest (POI) information, and so on. A location determining circuit or system such as location determining circuit 134 (see FIG. 5) may periodically determine (e.g., obtain, request or determine a position fix, update a location, etc.) the location of device 10 at a standard rate or period (e.g., every second, twice per second, etc.) on a continuous, ongoing basis. Utilizing a location determining system in such a manner, however, typically requires significant power. Should a device rely on a power source such as a battery (e.g., as in the case with typical mobile phones, smart phones, and other mobile devices), the available usage time of the device may be significantly decreased because of the power requirements of the location determining system.

Figure 6:
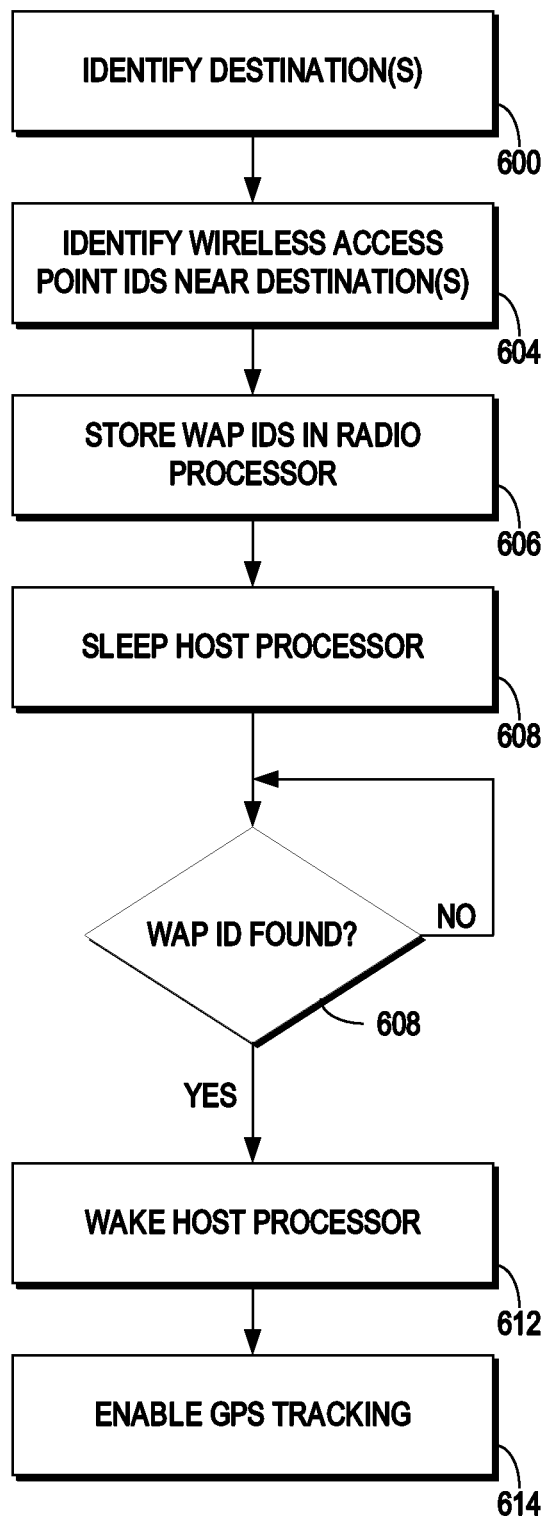
FIG. 6 is a flowchart of a method of using a wireless access point identifier for position determination, according to an exemplary embodiment.

Referring now to FIG. 6, a flowchart of a method of using a wireless access point identifier for position determination will be described. The operations described may be operable on mobile device 10, a remote server 132 (e.g., a shared, scaleable computing resource such as a cloud computing environment, or one or more other server computers), or partially operable on both device 10 and remote server 132. The operations described in FIG. 6 may be performed in any order, at the same time as other operations are performed, etc. One or more of the operations may be implemented apart from others of the operations, in various embodiments.

At an block 600, processing circuit 101 is configured to identify a location, such as one or more destinations (including waypoints) or other locations of interest. Locations may comprise location data, such as latitude/longitude and/or altitude data or data using other coordinate or reference systems, such as wireless access point identifiers, and may further comprise a textual or alphanumeric location name. Processing circuit 101 may be configured to receive the location or locations from a user (e.g., via user input device), from one or more applications operating on circuit 101 (such as a friend finder application, family connect application configured to share location data among family members or other friend or buddy lists), from a remote server coupled to the Internet (e.g., from a social networking site, navigation or mapping system, etc.), or from other sources. In one embodiment, processing circuit 101 may be configured to operate a distinct software application or service configured to register or store locations as they are received, and to retain a plurality of such locations.

At a block 604, processing circuit 101 is configured to identify at least one wireless access point within a predetermined distance of the one or more locations. Circuit 101 may be configured to send the locations to a remote server 132 configured to operate a database of wireless access point identifiers and corresponding location data. Server 132 may be configured to receive the locations, look up one or more wireless access point identifiers (e.g., cellular base station IDs, Wi-Fi transceiver IDs, Wi-MAX transceiver IDs, etc.), and return the wireless access point identifiers to circuit 101. For example, server 132 may be configured to operate a map application made by Google, Inc., Mountain View, Calif., which may store cellular IDs for cellular towers mapped to approximate locations. Alternatively, circuit 101 may identify wireless access points with reference to a local database stored on device 10. In some circumstances, circuit 101 may be configured to receive wireless access point identifiers from a user via a user input device.

Wireless access point identifiers may comprise numeric, textual or alphanumeric strings used to identify a wireless access point, preferably uniquely. Circuit 101 or server 132 may be programmed with a predetermined distance indicating how near a wireless access point is to be to the location before being identified as being near a wireless access point. The predetermined distance may about one mile or less, about 5 miles or less, about 30 miles or less, about 45 miles or less, or other distances, for example in the case where the wireless access point is a cellular base station or cell site, or about 120 feet or less, about 300 feet or less, or other distances, for example in the case where the wireless access point is a Wi-Fi access point. The predetermined distance may be measured using other methods. For example the predetermined distance may mean within one cell range of the location of interest, such as in a case where the database already has locations mapped to their closest cellular IDs. In other example embodiments, the wireless access point may be identified as associated with the location of interest by any association, such as being in the same cell range. Different predetermined distances may be associated with different destinations or locations of interest. The predetermined distance may be pre-programmed by a manufacturer of device 10, pre-programmed by a developer of the distinct software application or service, received from a user or IT professional via a user input device, received from a server computer operated by a wireless carrier or enterprise, or received from other sources. Wireless access points 604 may be stored on device 10, on remote server 132, on a memory card inserted into device 10, or on another medium. The service or software application may be configured to map the locations to one or more of a list of wireless access point IDS that are close to or near the location. According to one advantageous embodiment, a plurality of cell IDs surrounding or adjacent to the location of interest may be mapped to the location, to allow for the device 10 approaching from a variety of directions, or to allow for the location being near an overlap between two cells within the cellular coverage region.

At a block 606, processing circuit 101 may optionally be configured to store the identified wireless access protocol IDs in a list in a memory on the radio processor 104 chip. In one embodiment, host processor 102 may be configured to operate the service or application described with reference to block 604. In that case, host processor 102 may be configured to transfer, communicate, or transmit the identified wireless access protocol IDs to radio processor 104. In an alternative embodiment, radio processor 104 may operate a portion or all of the service, and radio processor 104 may be configured to store the identified wireless access point IDs on chip 104. In other embodiments, the IDs may be stored on shared memory, off-chip memory, or memory off-device 10.

By transferring the IDs off of the memory of the host processor chip, host processor 102 may be configured to enter or operate in a reduced power mode (block 608), while radio processor 104 may continue or begin to detect wireless access point identifiers. The reduced power mode may be a standby mode, suspend mode, idle mode, hibernation mode, or other operating mode. The reduced power mode may be any mode in which some power is consumed but less power is consumed than in a normal operating mode (i.e., a mode in which typical host processor functions are operable). For example, a reduced power mode may reduce power consumption by at least about 50%, or at least about 75% or at least about 90%, or other amounts.

At block 610, circuit 101 may be configured to monitor, listen for, detect or receive wireless access point identifiers. The monitoring at block 610 may be accompanied by operating one or more portions of device 10 (such as the location determination circuit 134) at a first power setting or state (e.g., powered-down, reduced power, low power, sleep state, etc). In one embodiment, radio processor 104 may be configured to detect the wireless access point identifiers, so that host processor 102 may also operate with a power setting or state, such as entering a reduced power mode. In alternative embodiments, host processor and radio processor, or other processing circuit arrangements may be configured to detect the wireless access point identifiers. In one example, circuit 101 may detect a signal from a new cellular base station in range of device 10, the signal comprising identifier data for the base station. Circuit 101 may be configured to execute a hand-off from one cellular base station signal or channel to the new cellular base station signal or channel. Alternatively, circuit 101 may merely detect the presence of the new cellular base station and store the identifier of the base station without executing a hand-off, for example based on signal strength considerations.

Upon receipt of each new wireless access point identifier, circuit 101 may be configured to compare the detected wireless access point identifier to the one or more wireless access point IDs identified in block 604 to look for a match, to determine whether device 10 is within a target area or target location. If a match is found, circuit 101 has determined that device 10 is near, in the vicinity of, or within the predetermined distance of a destination or location of interest. In that case, circuit 101 may be configured to optionally send a notification message to wake host processor 612, to switch it to a normal operating mode (block 612) and initiate location determination based on the comparison (block 614). If no match is found, circuit 101 may continue searching for wireless access point IDs without initiating the location determination.

At block 614, location determination may be initiated in a number of ways. Location determination circuit 134 may be operated in a second power setting or state different than the first power setting state, which may be powered on, enabled, or brought out of a sleep state. In one example, circuit 101 may be configured to initiate a periodic or continuous generation of location data, for example using location determination circuit 134 (FIG. 5). Location determination circuit 134 may in this mode be configured to track the location of device 10 using a global positioning system according to any of various location determination technologies, such as those discussed herein. Circuit 134 may provide finer periodic location updates, such as at least about one location fix per minute, at least about one location fix per two minutes, at least about one location fix per ten minutes, etc. The periodic updates may be generated at regular or irregular intervals of time. Location determination circuit 134 may be powered in this mode, and the portion of host processor 102 operating the service may be powered in this mode. By enabling GPS tracking, device 10 may be guided to the destination or waypoint of interest with a finer resolution of tracking location of device 10.

According to one exemplary embodiment, circuit 101 may be configured to operate a family connect application, friend finder application, or other application configured to share location data among a plurality of mobile devices. In this embodiment, circuit 101 may be configured, in response to finding the wireless access point ID at step 610, to generate a wireless message, address the wireless message to another computing device, and/or transmit the wireless message to the other computing device using the wireless transceiver 120. For example, a parent may wish to know when their child is approaching a school, friend's house, park, or other intended destination of the child. Device 10 may be carried by the child and be configured to store a location associated with the destination. The location may be passed from the family connect application to the service described herein with reference to blocks 600-614. When the device 10 comes within range of a cellular ID tower closest to or near the destination, the message (e.g., text message, instant message, e-mail, paging message, phone call, or other message or alert) is sent from device 10 to a parent's device (e.g., home computer, laptop, mobile device, etc.).

According to another embodiment, the destination or location of interest may comprise a waypoint along a route between a starting point and a destination point. For example, device 10 may be programmed to navigate a user to a waypoint and then on to a final destination point (or any other number of points along a planned route). Device 10 may then operate in GPS tracking mode as device 10 gets near or in the vicinity of each waypoint along the way, then return to a non-GPS tracking mode (e.g., and optionally also a host processor sleep mode) between waypoints.

According to one particularly advantageous scenario, device 10 may be configured to cease GPS tracking while device 10 is travelling on a highway along a route on the way to a destination while device 10 is still beyond the predetermined distance from the destination. Significant power savings can be realized in this scenario.

Figure 7:
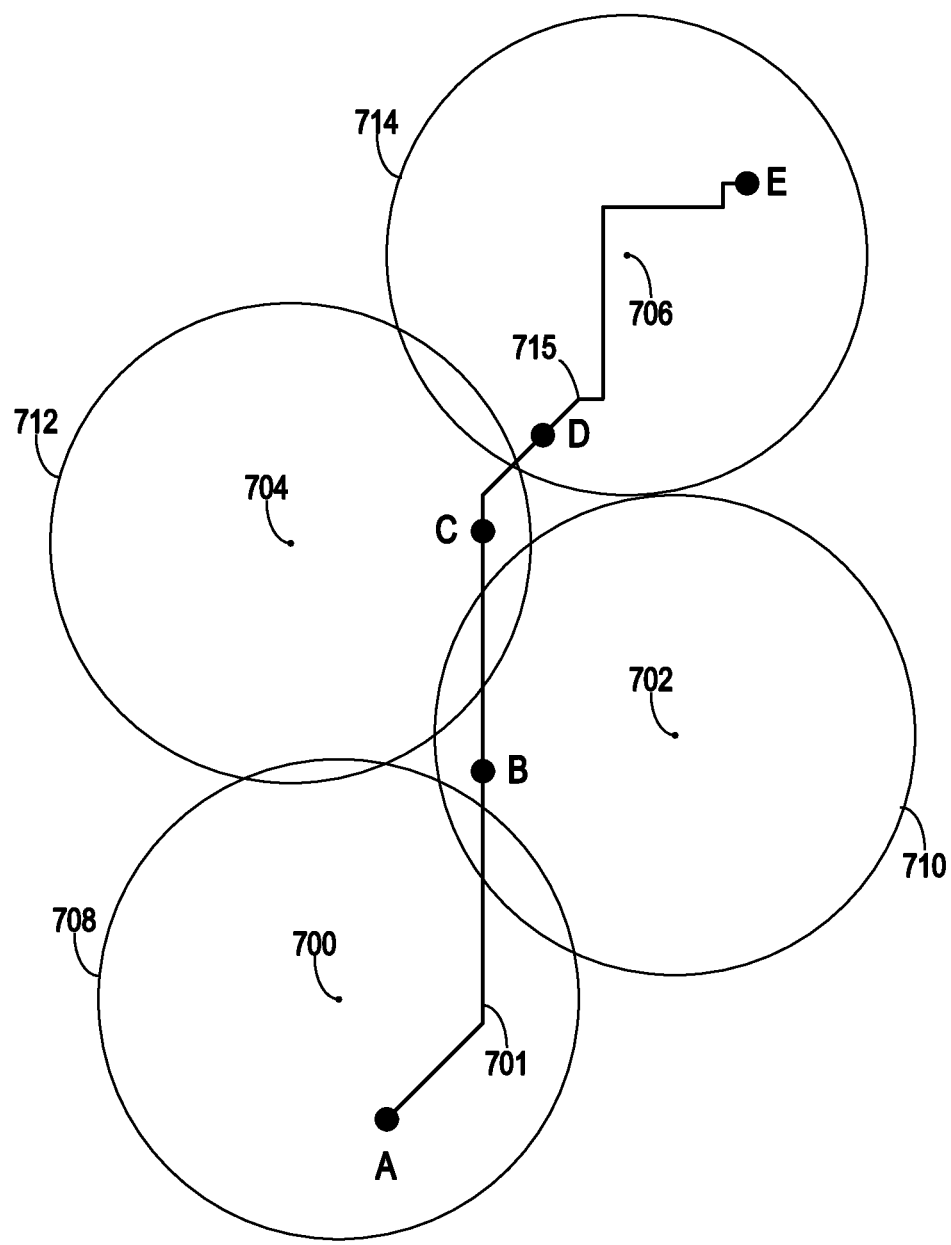
FIG. 7 is a schematic diagram of a cellular coverage area, according to an exemplary embodiment.

Referring now to FIG. 7, a schematic diagram of a cellular coverage area is shown. In this scenario, device 10 begins at location A and sets a destination location E using a navigation mapping program operating on device 10. Device 10 is configured to plan a route 701 from start location A to destination location E. Device 10 is configured to store destination data associated with destination location E, which may be stored in radio processor 104. Device 10 is configured to transmit the location data for location E to remote server 132, which looks up in a database location E and identifies a cellular ID for cellular base station 706 which is within a predetermined distance of destination location E. Device 10 receives this cellular ID and stores it in memory, either on host processor 102, on radio processor 104 or elsewhere. In this way, device 10 has determined a wireless access point within a predetermined distance of the destination location E. Host processor then enters a sleep mode.

As device 10 moves along route 701, device 10 is configured to detect wireless access point identifiers using its wireless transceiver. As device 10 reaches location B, device 10 has detected a wireless ID for cellular site 702 having range 710. Device 10 compares the wireless ID to the database or list and does not find a match. Therefore, GPS tracking continues to be disabled or not operational and, optionally, host processor 102 remains in reduced power mode. Other applications or user input may call host processor 102 out of reduced power mode for other functions. As device 10 reaches point C, it has detected a wireless ID for cellular site 704 having range 710. Device 10 compares the wireless ID for site 710 to the database or list and does not find a match. Therefore, GPS tracking continues to be disabled. As device 10 reaches point D, it has detected a wireless ID for cellular site 706 having range 714. Device 10 determines that the wireless ID matches the determined wireless access point. Radio processor 104 sends a notification message to wake up host processor 102 and to notify host processor 102 that a match has been found. Host processor 102 enables GPS tracking to provide navigation instructions via a user interface device to assist the user in navigating the final route 715 to destination E.

Various embodiments disclosed herein may include or be implemented in connection with computer-readable media configured to store machine-executable instructions therein, and/or one or more modules, circuits, units, or other elements that may comprise analog and/or digital circuit components configured, arranged or programmed to perform one or more of the operations recited herein. For example, a processing circuit may comprise one or more circuits, integrated circuits, processors, components, etc. which may be mounted on a single board or on a plurality of circuit boards, within a single housing or in multiple housings. By way of example, computer-readable media may include RAM, ROM, CD-ROM, or other optical disk storage, magnetic disk storage, or any other non-transitory medium capable of storing and providing access to desired machine-executable instructions.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A mobile computing device comprising:
a wireless transceiver;
a processing circuit comprising a host processor and a radio processor which are distinct processing components, the processing circuit configured to identify a location, to identify a wireless access point within a predetermined distance of the location, to detect a wireless access point identifier using the wireless transceiver, while the host processor is configured to operate in a reduced power mode, to compare the detected wireless access point identifier to the identified wireless access point, and to initiate location determination based on the comparison, wherein the host processor is configured to switch to a normal power mode in response to the initiation of location determination based on the comparison.

2. The mobile computing device of claim 1, wherein the processing circuit is configured to identify a plurality of locations by receiving the locations from a plurality of location-based applications operating on the processing circuit.

3. The mobile computing device of claim 1, wherein the detected wireless access point identifier is a cellular base station identifier.

4. The mobile computing device of claim 1, wherein the processing circuit is configured to identify a plurality of wireless access points within the predetermined distance of the location and to compare the detected wireless access point identifier to the plurality of identified wireless access points.

5. The mobile computing device of claim 1, wherein the host processor and the radio processor are distinct processing components on separate parts or on a multi-core chip.

6. The mobile computing device of claim 1, wherein the radio processor is configured to, while the host processor is operating in the reduced power mode, retain the identified wireless access point in memory and detect the wireless access point identifier.

7. The mobile computing device of claim 6, wherein the radio processor is configured to continue detecting wireless access point identifiers when the host processor is in the normal power mode.

8. The mobile computing device of claim 1, wherein the initiation of location determination comprises initiating a periodic generation of location of the mobile computing device to track the location of the mobile computing device using a global positioning system.

9. The mobile computing device of claim 1, wherein the processing circuit is configured to identify the wireless access point within the predetermined distance of the location by transmitting data regarding the location wirelessly to a remote server and receiving from the remote server the wireless access point.

10. The mobile computing device of claim 1, wherein the processing circuit is configured to generate a wireless message, address the wireless message to another computing device, and, based on the comparison, to transmit the wireless message using the wireless transceiver.

11. The mobile computing device of claim 1, wherein the location is a waypoint along a route between a starting point and a destination point.

12. A method operable on a mobile computing device, comprising:
   storing a destination location;
      determining a wireless access point associated with the destination location;
      operating a location determination circuit of the mobile computing device at a first power setting, the mobile computing device comprising a host processor and a radio processor which are distinct processing components;
      detecting a wireless access point identifier using a wireless transceiver of the mobile computing device while the host processor is operating in a reduced power mode;
      comparing the detected wireless access point identifier to the determined wireless access point;
      initiating continuous location generation with the location determination circuit operating at a second power setting based on the detected wireless access point identifier matching the stored wireless access point; and
      switching the host processor to a normal power mode in response to the initiation of continuous location determination.

13. The method of claim 12, wherein detecting comprises receiving the wireless access point identifier over a cellular wireless communication channel.

14. The method of claim 12, wherein the continuous location determination comprises a periodic generation of location of the mobile computing device to track the location of the mobile computing device using a global positioning system.

15. A non-transitory computer-readable storage medium having stored thereon machine-readable instructions for causing, when executed, one or more machines to perform the following:
   storing a destination location in a mobile computing device, the mobile computing device comprising a host processor and a radio processor which are distinct processing components;
   determining a wireless access point within a predetermined distance of the destination location;
   detecting a wireless access point identifier using a wireless transceiver of a mobile computing device while the host processor is operating in a reduced power mode:
   comparing the detected wireless access point identifier to the determined wireless access point;
   initiating continuous location generation based on the detected wireless access point identifier matching the determined wireless access point; and
   switching the host processor to a normal power mode in response to the initiation of continuous location determination.

16. The storage medium of claim 15, wherein detecting comprises receiving the wireless access point identifier over a cellular wireless communication channel.

17. The storage medium of claim 15, wherein the continuous location determination comprises a periodic generation of location of the mobile computing device to track the location of the mobile computing device using a global positioning system.

* * * * *